3,239,501
ANTIBIOTIC AMINE ADDITION COMPOUNDS
Lajos Stankovics, Ferenc Varga, Gyorgy Dobias, Gyorgy
Szecsey, Laszlo Tardos, and Ilona Erdelyi, Budapest,
and Eva Szentirmai nee Jeges, Erd, Hungary, assignors
to Chinoin Gyógyszer-és Vegyészeti Termékek Gyára
Rt., Budapest, Hungary, a firm
No Drawing. Filed Jan. 2, 1964, Ser. No. 335,370
Claims priority, application Hungary, Feb. 12, 1963,
CI-429; Feb. 19, 1963, CI-430
11 Claims. (Cl. 260—210)

This invention is concerned with new additional compounds of therapeutic value, to the preparation of such compounds and to the use of same for therapeutic purposes or for the isolation of antibiotics. More particularly it relates to the formation of certain addition compounds of antibiotics containing a primary, secondary or tertiary amino group.

According to the first feature of the present invention there are provided addition compounds of antibiotics containing a primary, secondary or tertiary amino group formed with compounds of the general Formula I

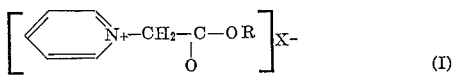

(I)

(where R stands for an alkyl radical containing 8–18 carbon atoms and X stands for a halogen atom) and salts of same.

Specific compounds of the invention are addition compounds of tetracycline, oxytetracycline and chlorotetracycline formed with compounds of the general Formula I in which R stands for a dodecylacetate group.

The addition compounds of the present invention have effect on resistant microorganisms even with doses used in cases of sensitive strains. Considering that the increasing resistance of noxious microorganisms (e.g., Staphylococci, Mycobacterii tbc.) became a very significant problem of therapy the above effect of the products of our invention is of great importance. Other advantages of the products are their low toxicity (orally), their high blood-level in in vivo tests and their slow excretion. The products are highly alkali soluble, consequently they are absorbed from the small intestine and do not damage the useful microorganisms of the large intestine.

It is presumed that the useful therapeutic properties of the compounds of the present invention are due to their large solubility in lipoids and to their surface tension decreasing effect.

According to a further feature of the invention there is provided a process for the preparation of addition compounds of antibiotics or salts of same which comprises reacting antibiotics containing a primary, secondary or tertiary amino group with compounds of the general Formula I and converting the products thus obtained into forms ready for direct use if desired.

As antibiotic component it is preferable to use tetracyclines (tetracycline, oxytetracycline, chlorotetracycline), streptomycine or neomycine. The antibiotic may be used in the form of the free base or its salts. From the group consisting of compounds of the general Formula I those members proved to be advantageous in which R stands for an esterification aliphatic radical containing 12 carbon atoms and X stands for a chlorine atom.

The reactants are used approximately in equimolecular proportion. The reaction is carried out in the presence of an aqueous organic solvent. It is preferred to use acetone or aqueous alcohols such as ethanol as a solvent. The reaction is carried out at 10–40° C., preferably at room-temperature.

According to a further feature of the present invention there are provided pharmaceutical compositions containing addition compounds of antibiotics containing a primary, secondary, or tertiary amino group formed with compounds of the general Formula I or salts of such compounds as active ingredient admixed with an appropriate pharmaceutical carrier, e.g., any of the carriers known per se for the production of pharmaceutical compositions.

The said pharmaceutical compositions may be in form suitable for oral, rectal or parenteral use. The compositions may contain sweetening, flavouring, colouring and preserving agents. Compositions intended for oral use may be prepared according to any method known to the art for the manufacture of pharmaceutical compositions, such as tablets, coated pills, suspensions, solutions, powders or granules, capsules, emulsions, etc. The tablets may contain non-toxic pharmaceutical excipients commonly used in the manufacture of tablets, thus they may contain lubricating, binding, granulating and disintegrating agents, diluents, etc.

Suspensions or solutions may contain the following excipients: suspending agents, dispersing or wetting agents, preservative, thickening agents, etc. Powders and granules may contain wetting and suspending agents.

The pharmaceutical compositions may be in the form of suppositories. These compositions are prepared by mixing the active compounds with a suitable non-irritating excipient, such as cocoa-butter or polyethylene-glycols.

The pharmacuetical compositions may be in the form of a sterile injectible preparation, such as an aqueous solution or susepnsion, or in any other non-toxic parenterally acceptable diluent or solvent.

According to another feature of the invention there is provided a process for the isolation of antibiotics containing a primary, secondary or tertiary amino group from their aqueous solutions by way of a rather economical and in case of some derivatives specific method, which comprises adding compounds of the general Formula I, where R and X have the same meaning as stated above, to the aqueous solution of the antibiotic, isolating the addition product of the antibiotic thus formed and setting free of the antibiotic in form of the free base or its salts formed with mineral acids.

The use of dodecylacetate-pyridiniumchloride (Tetranol manufactured by Egyesült Vigyimüvek of Budapest, Hungary) proved to be very advantageous.

The above process can be used advantageously for the precipitation of oxytetracycline. In this case oxytetracycline can be precipitated in a specific way from the fermentation liquid or from concentrates. The specific precipitation of oxytetracycline is of great importance, because the presence of Rhymicidine—the latter being also produced in course of the fermentation—renders precipitation of oxytetracycline difficult and further steps of purification are required in order to remove the by-product.

It is advantageous to use this process for the precipitation of tetracycline. In this case tetracycline can be isolated directly from the fermentation liquid, concentrates, or other aqueous solutions.

For carrying out the process the pH value of the aqueous solution containing the antibiotic is adjusted to 5. When the fermentation liquid is used as starting material the mycelium must be previously removed, e.g., by filtration at a pH value of 2.

The precipitating agent is added in form of its 5–15% aqueous solution. The quantity of this agent depends on the antibiotic content of the filtered fermentation liquid, or the aqueous solution. According to our investigations it has been found that 1 mole of precipitating agent is sufficient calculated on 1 mole of antibiotic. However the precipitating agent can be also used in excess. It is preferable to stir the reaction mixture vigorously for 30 minutes to 2 hours after the addition of the agent. The addition compound of the antibiotic formed with compounds of the Formula I can be precipitated by adjusting the pH value of the reaction mixture to 7.5–8. The precipitate is isolated and dried, if desired. However it is possible to decompose the precipitate without drying too. Drying can be effected in vacuo, at 40–65° C.

The antibiotic is readily recovered from the dried and powdered precipitate. The addition compound is extracted preferably with anhydrous methanol at 40–60° C. for 30 minutes to 2 hours depending on its quantity. It is preferable to use a 8–13 fold quantity of anhydrous methanol. The solid components are removed by means of filtration or centrifugation and the chlorohydrate of the antibiotic is isolated. According to this method the hydrochloride, other salts or the dihydrate of oxytetracycline are to be prepared.

When isolating tetracycline, one may use a tetracycline solution, concentrate or filtered fermentation liquid as starting material, preferably after adjusting the pH value of the solution to 2.5. The process is similar to that described in the case of oxytetracycline. Precipitation is carried out at the pH value of 8. After filtration the dried or humide precipitate is suspended in water and the pH value of the suspension is adjusted to 1.5–2.5 with an acid. The calcium ions are removed (e.g. in form of calcium oxalate), whereupon the compound of the Formula I is precipitated by adding potassium ferrocyanide. After removing the precipitate, tetracycline can be obtained in form of its hydrochloride or other salts by known methods.

Considering, that the compounds of the Formula I are not toxic, the product obtained by precipitation from the filtered fermentation liquid can be used directly for veterinary purposes on drying and admixing with carriers, e.g., calcium carbonate. Thus the compound containing oxytetracycline or tetracycline and dodecylacetate pyridiniumchloride is an effective veterinary preparation.

Further details of the process are to be found in the examples.

*Example 1.*—49.8 g. (0.1 mole) of oxytetracycline hydrochloride are added to the mixture of 1.5 l. of distilled water and 300 ml. of acetone. The reaction mixture is purified with 2% of charcoal and the solution of 34 g. (0.1 mole) of dodecylacetate-pyridinium chloride and 250 ml. of distilled water is added during the period of 30 minutes. The pH value of the solution is adjusted to 7.5–8 with ammonium hydroxyde, the precipitated product is filtered and suspended in distilled water. The solution thus obtained is filtered and the product is dried in vacuo at 45–50° C. over phosphorus pentoxide. Thus 67.0 g. of the addition product of oxytetracycline and dodecylacetate-pyridinium chloride are obtained (the active ingredient content of the product is equivalent to 41.5 g. of oxytetracycline dihydrate). Molecular weight: 768, decomposition point: 140–155° C. Analysis: Percent N=5.3–5.5.

The product proved to be non-toxic on mice even in the dose of 8000 mg./kg. Oxytetracycline-dodecylacetate pyridinium chloride has a prolonged blood level. The active ingredient content of the blood serum of rabbits was measured at various periods of time after administration. The following table contains the results of this test:

| | After administration | | | |
|---|---|---|---|---|
| | 1 hour | 3 hours | 6 hours | 8 hours |
| Active ingredient content of the blood serum in γ/ml | 1.12 | 1.22 | 1.15 | 1.17 |

Thus the blood level of the product did not decrease during the period of 8 hours after administration. Consequently the product provides prolonged blood-level and slow excretion.

Oxytetracycline and dodecylacetate exhibits resistance-decreasing effect. In case of *Staphylococcus aureus* and *E. coli* strains the product is effective in 7–10 times smaller dose, than oxytetracycline; it is effective against oxytetracycline resistant strains too.

*Example 2.*—46.2 g. of tetracycline hydrate are reacted with 34 g. of dodecylacetate pyridinium chloride according to the process described in Example 1. Thus 68 g. of the addition compound of tetracycline and dodecylacetate pyridinium chloride are obtained (the active ingredient content of the product is equivalent to 40.5 g. of tetracycline). Molecular weight: 749, decomposition point: 145–150° C. Analysis: Percent N=4.9.

Tetracycline dodecylacetate exhibits resistance-decreasing effect. In case of *Staphylococcus aureus* and *E. coli* strains the product is effective in 7–10 times smaller dose, than tetracycline, it is effective against tetracycline resistant strains too.

*Example 3.*—51.4 g. of chlorotetracycline hydrochloride are reacted with 34 g. of dodecylacetate pyridinium chloride according to the process described in Example 1. Thus 77.2 g. of the addition compound of chlorotetracycline and dodecylacetate pyridinium chloride are obtained (the active ingredient content of the product is equivalent with 43.2 g. of chlorotetracycline). Molecular weight: 784, decomposition point: 155–160° C. Analysis: N percent=5.4.

*Example 4.*—The pH value of 10,000 ml. of fermentation liquid, obtained by fermentation with *Streptomyces rhimosus* is adjusted to 2 with oxalic acid, whereupon the mycelium is filtered on Seitz-paper. The pH value of the filtered fermentation liquid is adjusted to 5 by adding a concentrated ammonium hydroxide solution. The 10% aqueous solution of 34.5 g. of dodecylacetate pyridinium chloride is added to the fermentation liquid, while stirring the reaction mixture constantly. Stirring is continued vigorously for 30 minutes, whereupon the pH value is adjusted to 7.7 with an ammonium hydroxide solution. The precipitated amorphous material is filtered on Seitz-paper, dried at 5° C. in vacuo and powdered. The product thus obtained is suitable for veterinary purposes (orally).

The above product, weighing 78.5 g. is extracted in a tenfold quantity of anhydrous methanol at 50° C. for 30 minutes. After filtration the methanolous solution is evaporated to one-tenth part of its orignal volume and 50 ml. of methanol containing 30% of hydrochloric acid are added. Thus 54 g. of oxytetracycline hydrochloride are obtained. The product can be purified by further precipitation. The yield is 10% higher than that in the case of precipitation with cetyl pyridinum bromide.

*Example 5.*—The pH value of 10,000 ml. of fermentation liquid, obtained by fermentation with *Streptomyces aureofaciens,* is adjusted to 2 with oxalic acid. The mycelium is filtered on Seitz-paper, whereupon the pH value of the filtered fermentation liquid is adjusted to 3 with a concentrated ammonium hydroxide solution. The 10% aqueous solution of 40 g. of dodecyl acetate pyridiniumchloride is added while stirring, whereupon the pH value of the reaction mixture is adjusted to 7.5 using a concentrated ammonium hydroxide solution. The precipitated amorphous material is filtered on Seitz-paper and the precipitate is suspended in water. The pH value of the suspension is adjusted to 2 with concentrated hydrochloric acid. The free calcium ions of the solution are completely precipitated in form of calcium oxalate by addition of the appropriate quantity of oxalic acid. The 10% aqueous solution of 5 g. of potassium ferrocyanide are added, the precipitate formed is filtered and washed with aqueous hydrochloric acid, having the pH value of 2. The precipitate is 44 g. of dodecylacetate pyridiniumchloride.

15% of sodium chloride and an equal volume of anhydrous n-butanol are added to the filtrate. The mixture is stirred vigorously for 30 minutes, the aqueous phase is separated, treated with charcoal, filtered and extracted repeately with 0.01 N hydrochloric acid. The solution is treated with charcoal and the pH value of the filtrate is adjusted to 4.5 with a 20% sodium hydroxide solution or with an appropriate buffer. Thus 42.5 g. of tetracycline chlorohydrate are obtained.

*Example 6.*—The pH value of 2 litres of fermentation liquid, obtained by fermentation with *Streptomyces aureofaciens* are adjusted to 2 with oxalic acid and the mycels are filtered. The pH value of the filtered fermentation liquid is adjusted to 3 with an ammonium hydroxide solution and the 10% aqueous solution of 40 g. of dodecylacetate pyridinium chloride is added while stirring, whereupon the pH value of the reaction mixture amounts to 7.5. The crude amorphous precipitate is filtered on Seitz-paper and suspended in an equal volume of n-butanol. After filtration the butanolous solutions are poured into 200 ml. of n-butanol, containing 10% of oxalic acid. The pH value of the solution amounts to 2 and the precipitate is filtered after 10 minutes. After purification by extraction crystalline tetracycline hydrate can be precipitated from the filtrate by adjusting the pH value of the solution to 4.7–5.2 with a 10% sodium hydroxide solution, filtering the product thus obtained after an hour of standing, washing and finally drying in vacuo at 55° C. The yield amounts to 70–75% calculated on the fermentation liquid.

*Example 7.*—The components are compounded and finished in form of tablets according to known methods. The composition of a tablet is the following:

|  | G. |
|---|---|
| Compound A | 0.8500 |
| Nicotinamide | 0.0250 |
| Aneurin hydrochloride | 0.0015 |
| Riboflavine | 0.0025 |
| Pyridoxine hydrochloride | 0.0005 |
| Methyl-p-hydroxy-benzoic acid | 0.0035 |
| Amylum solani | 0.0500 |
| Talcum | 0.0200 |
| Stearine | 0.0050 |
| Magnesium stearate | 0.0030 |

The compound A may be the addition compound of tetracycline, chlorotetracycline or oxytetracycline formed with dodecylacetate pyridinium chloride.

*Example 8.*—A composition for veterinary purposes can be prepared according to the following method:

The pH value of 20 l. of a tetracycline fermentation liquid (the activity of the solution amounts to 3000 chemical units/ml.) is adjusted to the value of 2.5 using a solution of diluted phosphoric acid. The reaction mixture is stirred for 20 minutes, whereupon it is filtered. The pH value of the filtrate is then adjusted to 6 using calcium hydroxide. The precipitated white $CaHPO_4$ becomes yellow because of the tetracycline adsorbed.

The mixture is stirred vigorously for 30 minutes, whereupon 12 g. (i.e., 20% of the tetracycline content) of dodecylacetate pyridinium chloride are added and vigorous stirring is continued. The pH value of the reaction mixture is adjusted to 5 using calcium hydroxide. The precipitated product is filtered and dried at 55° C. for 6–8 hours. Thus 312 g. of a composition suitable for veterinary purposes are obtained. The active ingredient content of the composition was found to be 183 mg. tetracycline/g. Yield: 95%.

What we claim is:

1. A compound selected from the group consisting of an addition compound of an antibiotic selected from the group consisting of tetracycline, oxytetracycline, chlorotetracycline, streptomycin and neomycin with a pyridinium compound of the formula:

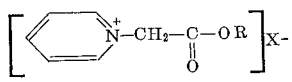

wherein R is alkyl of 8–18 carbon atoms and wherein X is chlorine; and physiologically compatible acid addition salts thereof.

2. An addition compound of tetracycline with a pyridinium compound of the formula:

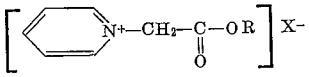

wherein R is alkyl of 8–18 carbon atoms and wherein X is chlorine, and physiologically compatible acid addition salts thereof.

3. An addition compound of oxytetracycline with a pyridinium compound of the formula:

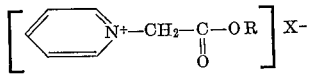

wherein R is alkyl of 8–18 carbon atoms and wherein X is chlorine, and physiologically compatible acid addition salts thereof.

4. An addition compound of chlorotetracycline with a pyridinum compound of the formula:

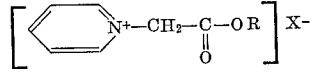

wherein R is alkyl of 8–18 carbon atoms and wherein X is chlorine, and physiologically compatible acid addition salts thereof.

5. An addition compound of streptomycin with a pyridinium compound of the formula:

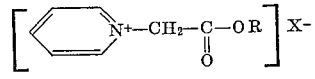

wherein R is alkyl of 8–18 carbon atoms and wherein X is chlorine, and physiologically compatible acid addition salts thereof.

6. An addition compound of neomycin with a pyridinium compound of the formula:

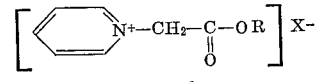

wherein R is alkyl of 8–18 carbon atoms and wherein X is chlorine, and physiologically compatible acid addition salts thereof.

7. An addition compound of tetracycline with dodecylacetate pyridinium chloride.

8. An addition compound of oxytetracycline with dodecylacetate pyridinium chloride.

9. An addition compound of chlorotetracycline with dodecylacetate pyridinium chloride.

10. An addition compound of streptomycin with dodecylacetate pyridinium chloride.

11. An addition compound of neomycin with dodecylacetate pyridinium chloride.

References Cited by the Examiner
UNITED STATES PATENTS

| 2,755,274 | 7/1956 | Muckter et al. | 260—210 |
| 2,837,513 | 6/1958 | Gailliot et al. | 260—559 |
| 2,871,264 | 1/1959 | Minieri et al. | 260—559 |
| 2,891,943 | 6/1959 | Keller et al. | 260—210 |

LEWIS GOTTS, *Primary Examiner.*